Dec. 26, 1944.  C. E. PETERSON ET AL  2,366,051
TOOL SUPPORT
Filed March 18, 1943  4 Sheets-Sheet 1
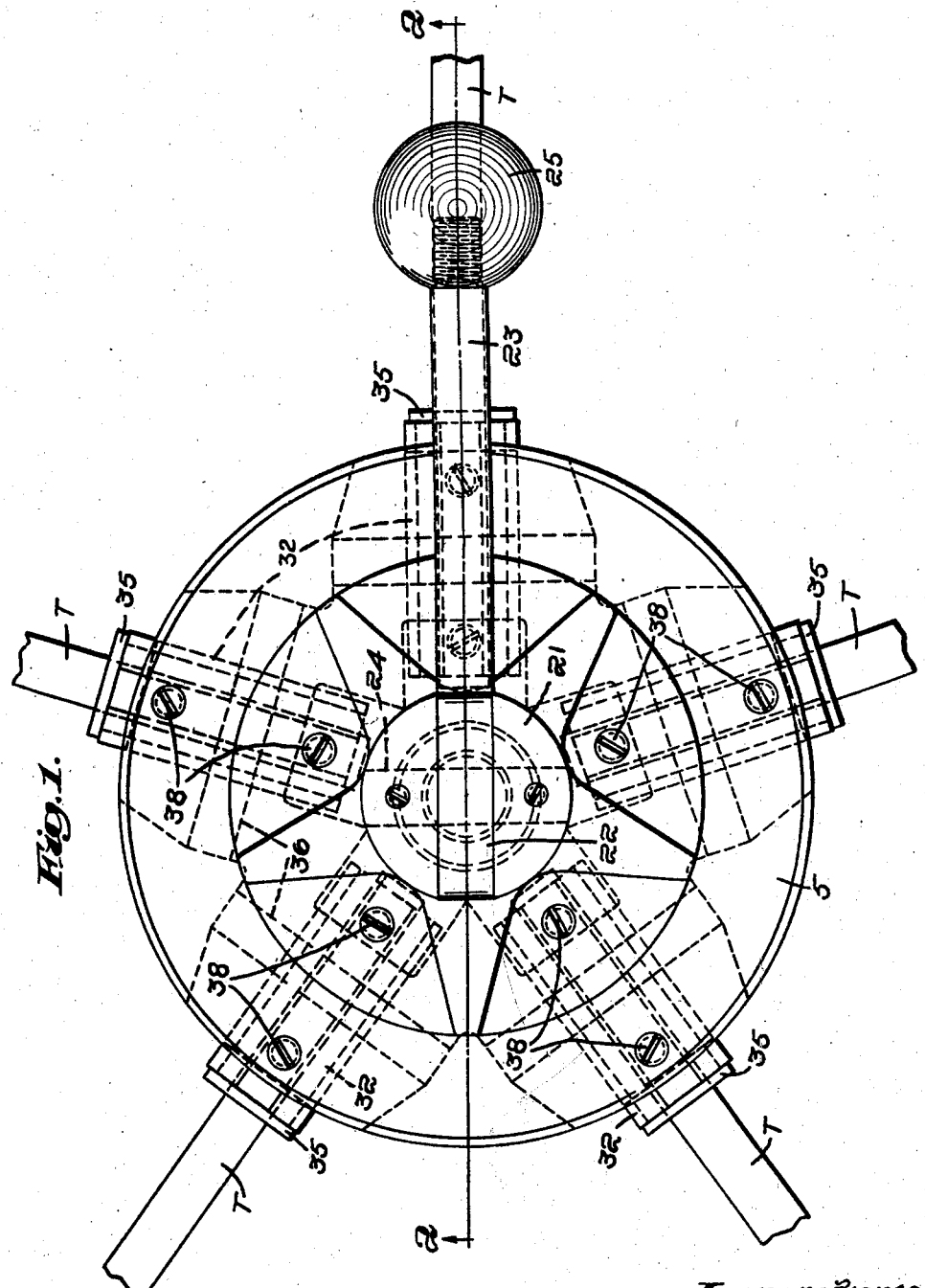

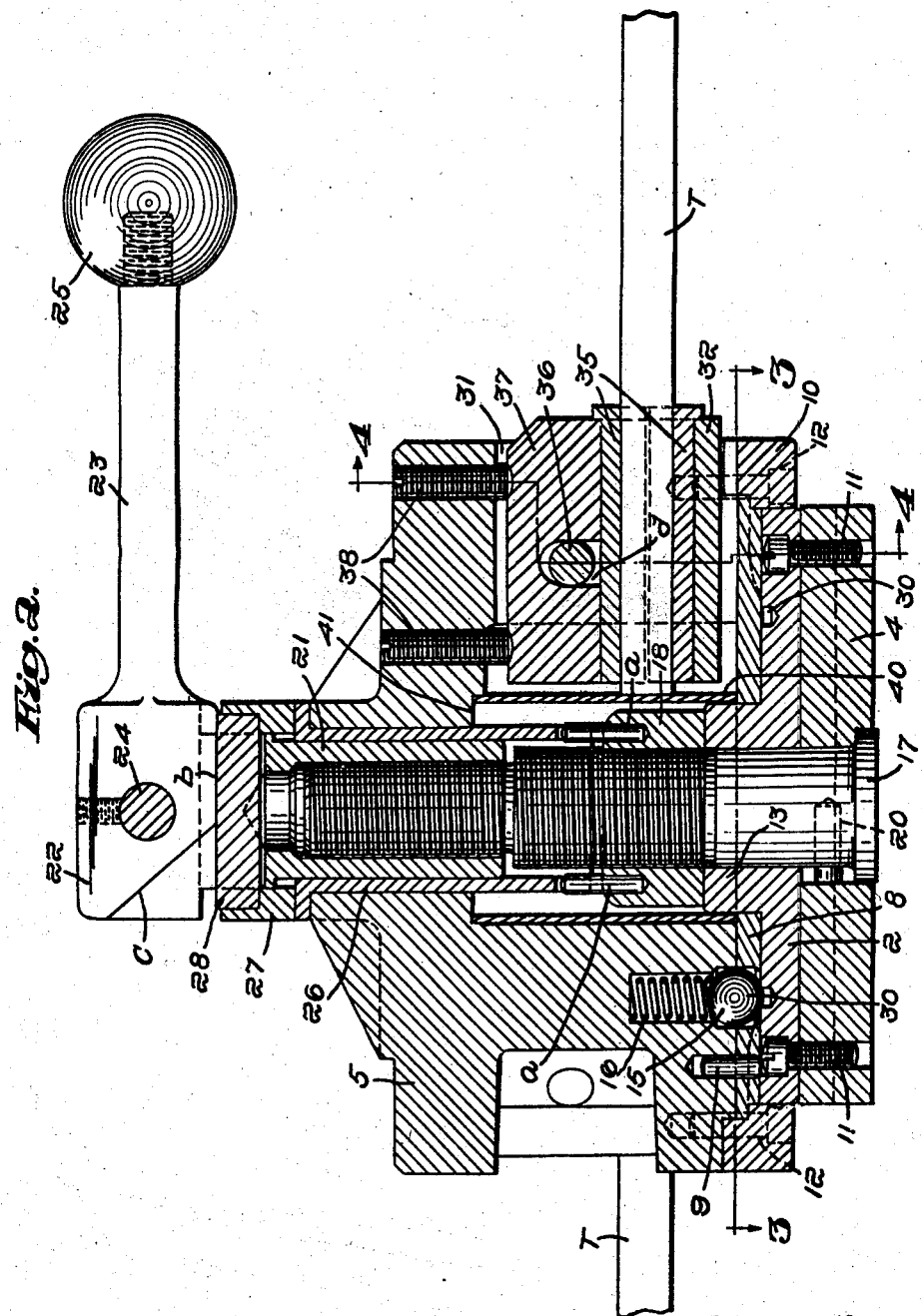

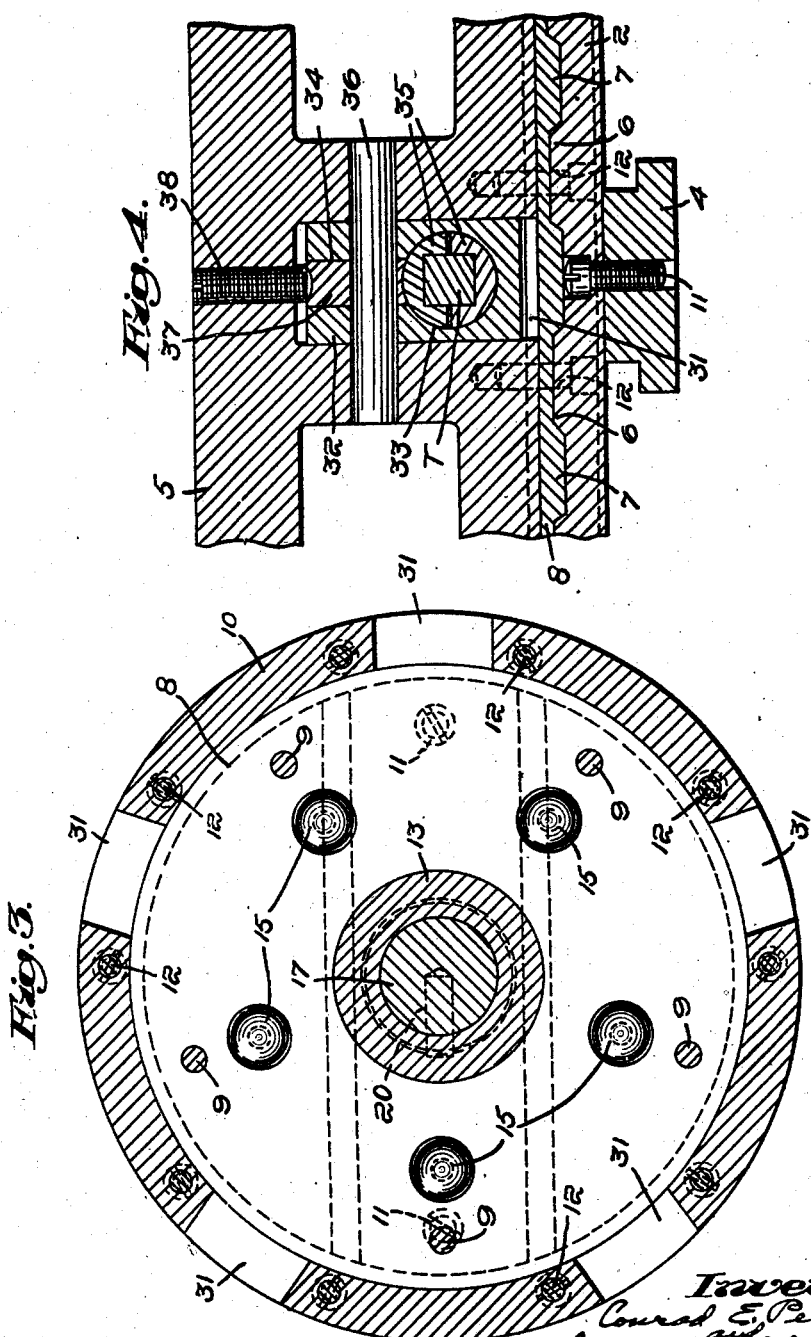

Patented Dec. 26, 1944

2,366,051

UNITED STATES PATENT OFFICE 2,366,051

TOOL SUPPORT

Conrad E. Peterson, Auburndale, and Gordon L. Olson, Arlington, Mass.

Application March 18, 1943, Serial No. 479,606

8 Claims. (Cl. 29—49)

This invention relates to work supporting structures of the turret type adapted for use in engine lathes, turret lathes, and other machine tools.

It aims to devise a structure of this type which will be exceptionally sturdy and reliable, while at the same time being easy to operate, affording ample adjustment for the tools, permitting the quick change from one tool to another, and adapted for the production of work with a high degree of accuracy.

The nature of the invention will be readily understood from the following description when read in connection with the accompanying drawings, and the novel features will be particularly pointed out in the appended claims.

In the drawings,

Fig. 1 is a plan view of a tool supporting structure embodying the invention in the form at present preferred;

Fig. 2 is a vertical, sectional view taken substantially on the line 2—2, Fig. 1;

Figure 7:
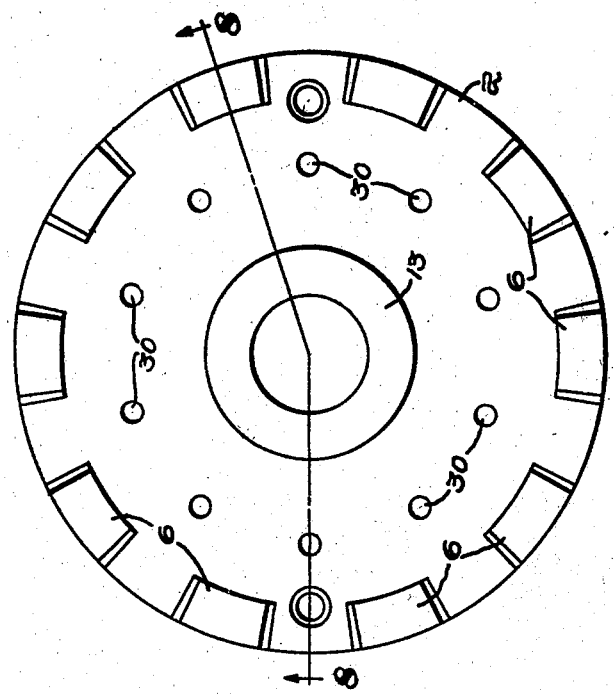
Figure 8:
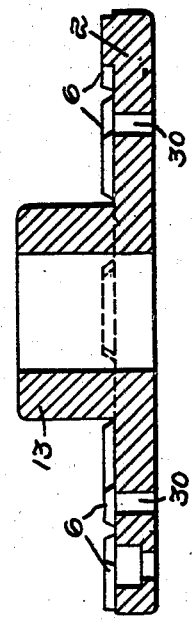
Figures 5, 6:
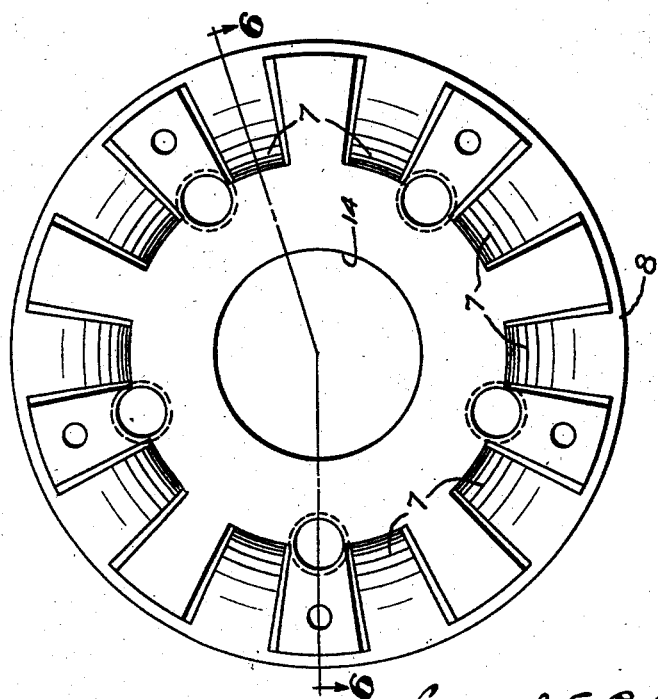

Figs. 3 and 4 are horizontal and vertical sectional views taken, respectively, on the lines 3—3 and 4—4 of Fig. 2;

Figs. 5 and 6 are plan and sectional views, respectively, of the indexing element which moves with the turret; and Figs. 7 and 8 are plan and sectional views, respectively, of the index plate.

The construction shown in the drawings comprises a base plate or index plate 2 having a guide plate 4 secured thereto by screws, this guide plate being of the cross-sectional form shown in Fig. 4 so that it is adapted to be slid into a slot of corresponding sectional form usually provided in the compound of an engine lathe or other machine tool. Mounted on the base 2 is the turret 5, provided with a series (in this instance five) of tool holders radiating from a common axis, and the turret is supported for rotation around its own axis and that of the plate. In order to position the turret accurately in each of its several operating positions, the index plate 2 is provided with a series of equally spaced radial lugs or teeth 6, as best shown in Figs. 4, 7 and 8, and the bottom of the turret has a series of correspondingly shaped radial lugs or teeth 7 to fit snugly into the spaces between the teeth or lugs 6. Preferably the teeth on the turret are not formed on the turret body itself but on a plate 8, Figs. 2, 5 and 6, which is secured to the bottom of the turret body by a clamping ring 10 and by dowel pins 9. Screws 12 secure the ring to the turret so that to all intents and purposes, except those of convenience in manufacture, the plate 8 forms an integral part of the turret. The turret is guided for indexing adjustment around its own axis by the engagement of the ring 10 with the peripheral edge of the index plate 2 and these parts are made with a high degree of accuracy because they are relied upon both to center and to guide the turret. Preparatory to making the indexing movement, however, the turret must be lifted sufficiently to carry the teeth or lugs 7 up above the upper surfaces of the stationary teeth 6 in the index plate 2. This operation is performed by mounting several steel balls 15 in the turret body, backing up each ball with a strong spring 16, and shaping the cavities in which the balls are mounted so that they can project slightly below the lower surface of the plate 8 but cannot come out at that surface. Consequently, until the turret is depressed in some manner, these spring-pressed balls hold it in a raised position where it can be rotated freely without interference from the index plate.

For this purpose a central pivot post or stud 17 is provided with upper and lower externally screw-threaded sections, and a nut 18, Fig. 2, threaded on the lower of said sections clamps this post, the index plate 2, and the guide plate 4 rigidly together. Also, the post carries a pin 20 projecting laterally therefrom into a slot in the guide plate which prevents any possibility of relative rotation of these two members. Threaded on to the upper screw-threaded section is a sleeve 21 and this sleeve is centrally slotted at its upper end to receive the cam-shaped end 22 of a lever 23, a pivot pin 24 extending through the cam and the upper end portions of the sleeve at opposite sides thereof where it serves to connect these parts operatively together. The lever carries a ball end or handle 25. It is desirable that the rotative movement of the turret shall be independent of the lever 23, and for this reason a bearing bushing 26, Fig. 2, encircles the sleeve 21, spaces it from the turret body, and is held against rotation by two pins a—a, both seated in the nut 18 and entering slots formed in the lower end of the bushing. At the upper end of the bushing it is flanged to rest on the top of the turret body, and a collar 27 is seated on this flanged part of the bushing and is notched to receive the opposite ends of a hardened bar 28 which forms an anvil or wear-piece on which the cam 22 rests.

In order to unlock the turret, the lever 23 is first backed off about an eighth of a turn and then is swung upwardly around the pivot 24 so that the pressure which the cam exerts on the anvil 28 will be shifted from the face b to the face c. This allows the spring-pressed balls 15 to lift the turret far enough to free it from the index plate 2, at which time the turret can be rotated freely to bring any desired tool into operative position. The turret is locked in its new position by depressing the lever 23 and then giving it about an eighth of a turn, which operates through the engagement of the threads of the sleeve 21 with those on the post 17 and also through the collar 27 and the flange of the bushing 26 to tighten the turret down securely on to the index plate 2.

While there are only five tools, there are ten indexing positions, since some of these tools have an offset end or are otherwise so designed as to operate on the work in an angularly spaced relationship to the tool holder in which they are mounted. Consequently, there are ten teeth 6 on the index plate and the same number of cooperating teeth 7 on the turret. Also, in order to save time in registering the turret with its various indexing positions, ten shallow holes 30, Figs. 2 and 7, are drilled in the upper surface of the index plate 2 in radial alignment with the centers of the respective spaces between the teeth 6. Consequently, when the turret is rotated, the five balls 15 will drop slightly into five of these holes 30 each time that the turret comes into any indexing position. This tells the operator, as he adjusts the turret to a new position, exactly when the turret is registered with that position. The turret then can be locked quickly, as above described. This saves time which otherwise would be spent in bringing the tool into exactly the right relationship to the index plate.

The invention also involves a novel means for supporting the tools in the turret. As best shown in Figs. 2, 3 and 4, the turret 5 is provided with five vertical slots 31 equally spaced around its periphery. Each of these is adapted to receive a tool holder 32 which, as best shown in Fig. 4, is provided with a circular hole 33 extending longitudinally therethrough and with a vertical slot 34 which opens from this hole to the upper surface of the holder 32. In the hole 33 any one of several different kinds of bushings may be mounted, each adapted to receive the shank of a tool T, the nature of these bushings depending somewhat upon the shape and similar characteristics of the tool itself. The particular bushing shown at 35 in Fig. 4, consists of a split cylinder provided with a square hole or bore to receive the square shank of the tool T. Other forms of bushings, however, may be substituted for that shown at 35, and this necessarily will be true in using some tools. A flange on its outer end prevents the bushing from being pushed into the holder too far. The tool holder is held in its operative position by a horizontal pivot pin 36 extending transversely through the slot or cavity 31 and also through a hole in the holder. Fitting in the slot 34 is a clamping block or bar 37, which is slotted as shown at d in Fig. 2, to fit over the pin 36; and two clamping screws 38—38, Fig. 2, are threaded through the turret top and bear on this block at opposite sides of the vertical plane through the axis of the pivot 36. Thus when these screws are tightened down, they clamp the tool between the two halves of the bushings 35; also they clamp the bushing to the tool holder 32, and they lock all of these parts in a definite angular relationship to the turret. This relationship, however, can be adjusted by backing out one of the screws 38 and turning in the other so as to support the tool T in the desired angular position. Also, because the bushing 35 is of circular cross-sectional form and fits into a hole in the holder 32 of the same form, the tool can be rotated around the axis of the hole to change the angle of its cutting face or edge on the work. And the screws secure the tool rigidly in its operative position notwithstanding both of these adjustments.

In order to prevent the entrance of metal chips or other particles into the surfaces which revolve, one relatively to another, a sleeve 40, Fig. 2, is set into the turret 5 where it is clamped between the plate 8 and the shoulder 41 in the turret body. It surrounds the boss 13, the nut 18, and the other parts lying immediately above the nut, and forms an inner wall for the tool holder cavities 31, serving as a guard to prevent foreign material, such as that just mentioned, and which naturally finds its way into these cavities, from getting between friction surfaces where it would interfere with the free indexing movement of the turret.

It will be evident from the foregoing that the invention provides a tool supporting structure of the turret type in which the rotation of the turret to move one tool out of working position and another into that position, can be made very quickly and with relatively little effort. Also, the individual tools can be changed quickly, when desired, and adjusted around two axes at right angles to each other to bring them into the proper relationship to the work. The preliminary registration of the turret with each indexing position performed by the balls 15, as above described, contributes to efficiency and ease of operation of the apparatus. Because of the fact that the handle or lever 23 does not rotate with the turret but remains stationary and can be moved into any desired position around the axis of the pivot post 17, it can be initially placed where it will be out of the way, and it will remain there notwithstanding the shifting of the turret. It should also be noted that while a cam is provided to perform part of the operation of locking and releasing the turret to the index plate, the final locking movement is performed by tightening up the bushing 21 on the screw-threaded post 17, and that the initial releasing movement involves the backing up or unthreading of the bushing 21 for a short distance. Thus a screw is depended upon for the final locking and initial releasing of the turret, but a cam and lever action is utilized to produce both a quick downward movement of the turret practically into its locked position and to permit a quick rise of the turret after its initial slight releasing movement produced by backing up the sleeve 21. This slight initial release is necessary before the lever can be operated to turn the cam from its locked position to its releasing position. It will also be observed that when the turret rises it carries the parts 26, 27 and 28 with it.

While we have herein shown and described a preferred embodiment of our invention, it will be evident that the invention may be embodied in other forms without departing from the spirit or scope thereof.

Having thus described our invention, what we desire to claim as new is:

1. In a tool supporting structure, the combination of a turret mounted for indexing movement, said turret being provided with a plurality of upright slots in the edge thereof, a tool holder positioned in one of said slots and adapted to support a tool in an approximately horizontal position, means supporting said holder for rocking movement in said slot about a horizontal axis extending through said slot transversely thereto, said holder having a bore of circular cross-sectional form extending thereinto from its outer end, a bushing fitting in said bore and provided with a socket to receive the shank of a tool, said bushing being longitudinally split, and means for clamping said tool in said bushing and holder including two screws threaded through a portion of said turret above said slot in position to exert pressure on the bushing at opposite sides of a vertical plane through said axis, whereby said screws are operable to adjust said tool angularly about said axis.

2. In a tool supporting structure, the combination of a turret mounted for indexing movement, said turret being provided with a plurality of upright slots in the edge thereof, a tool holder positioned in one of said slots and adapted to support a tool in an approximately horizontal position, means supporting said holder for rocking movement in said slot about a horizontal axis extending through said slot transversely thereto, said holder having a bore of circular cross-sectional form extending thereinto from its outer end, a bushing fitting in said bore and provided with a socket to receive the shank of a tool, said bushing being longitudinally split, and said holder being slotted longitudinally above said bore, a clamping bar positioned in the slot in said holder and resting on said bushing, and two screws threaded through a part of said turret above said holder in position to bear on said bar at opposite sides of the pivotal axis of said holder, whereby said screws are operable both to clamp said bar, holder, bushing and tool shank securely together and also to adjust said holder angularly about said axis.

3. In a tool supporting structure according to preceding claim 2, a construction in which said pivotal mounting for the holder includes a pivot pin extending transversely through said holder, and said clamping block rides loosely on said pin and has considerable freedom of vertical movement relatively thereto.

4. In a tool supporting structure, the combination of a turret mounted for indexing movement around a vertical axis, said turret being provided with a plurality of upright slots in the edge thereof, a tool holder fitting snugly between the lateral walls of one of said slots, a pivot extending horizontally through said slot and said holder transversely thereto and supporting the holder for angular movement in the slot about the axis of said pivot, said holder having a hole extending longitudinally thereinto to receive the shank of a tool and being slotted longitudinally above said hole and in line therewith, a clamping bar fitting in the latter slot and mounted to rock on said pivot, and two screws threaded through the wall of the turret above the tool holder slot and extending into said slot and bearing on said block at opposite sides of said pivot, whereby they are operable to clamp the tool in the holder and to adjust the angle of the tool around the axis of said pivot.

5. A tool supporting structure comprising a turret having means for holding a plurality of tools, a stationary index plate on which said turret is mounted for rotative adjustment into various indexed positions relatively to the plate, said plate and said turret having parts cooperating to lock said turret to said plate in different indexed positions but said parts being releasable, one from the other, by lifting the turret, a central stationary threaded post secured rigidly to said plate and around which said turret rotates during its indexing movement, said post having two screw-threaded portions, one above the other, a nut cooperating with the lower of said portions to secure said post to said index plate, a sleeve threaded on the upper of said screw-threaded portions, a bushing in which said sleeve is rotatably mounted, said bushing being interposed between said sleeve and said turret and spacing the latter radially from the former, a collar surrounding said post at the upper end of the turret, an anvil carried by said collar, a lever fulcrumed on the upper end of said sleeve, a cam operable on said anvil by the movement of said lever for depressing said turret into locking relationship to said index plate, and a plurality of spring pressed balls carried by said turret and serving to lift the turret free from said index plate when the turret is released by said lever and cam, said plate having parts cooperating with said balls to register said turret yieldingly in its various indexed positions in readiness to be locked in any of said positions into which it is adjusted.

6. A tool supporting structure comprising a turret having means for holding a plurality of tools, a stationary index plate on which said turret is mounted for rotative adjustment into various indexed positions relatively to the plate, said index plate having radially extending tapered lugs on the margin thereof, a second plate having lugs complemental to those on said index plate and positioned to register with the latter to lock the two plates rigidly but releasably together, a ring secured to the bottom of said turret and locking said second plate to the turret, said ring having peripheral engagement with said index plate serving to center and guide the turret, spring means acting on said turret to lift it far enough to free the lugs of said plates from each other to permit the indexing movement of the turret, a central stationary screw-threaded post projecting through both of said plates, a nut screw-threaded on said post and cooperating therewith to lock the post rigidly to said index plate, a sleeve also screw-threaded on said post and having a part projecting beyond the upper end thereof, a lever fulcrumed on the upper end of said sleeve, said lever having a cam face thereon acting through parts outside of said sleeve and which are carried by and movable with said turret for depressing said turret against the action of said spring means and into locking relationship to said index plate, said lever being operable to release said turret and to rotate said sleeve around said post to assist in both said locking and releasing operations.

7. A tool supporting structure comprising a turret, a stationary index plate on which said turret is mounted for rotative adjustment into various indexed positions relatively to the plate, said plate and said turret having parts cooperating to lock said turret to said plate in different indexed positions but said parts being releasable, one from the other, by lifting the turret, a central stationary screw-threaded pivot post secured rigidly to said plate and around which said turret rotates during its indexing movement, said post having two screw-threaded portions, one above the other, a nut cooperating with the lower of said portions to secure said post to said index plate, a sleeve threaded on the upper of said screw-threaded portions, a bushing in which said sleeve is rotatably mounted, said bushing being interposed between said sleeve and said turret and spacing the latter radially from the former, a lever cooperating with said sleeve to depress said turret into locking relation to said plate, said turret being provided with a plurality of slots extending inwardly from the edge thereof, a tool holder mounted in each of said slots, each of said holders being adapted to receive and hold a tool, and a second sleeve surrounding said bushing, movable with said turret, and separating the space surrounding said post from said slots.

8. A tool supporting structure comprising a turret having means for holding a plurality of tools, a stationary index plate on which said turret is mounted for rotative adjustment into various indexed positions relatively to the plate, said plate and said turret having parts cooperating to lock said turret to said plate in different indexed positions but said parts being releasable, one from the other, by lifting the turret, a central stationary threaded post secured rigidly to said plate and around which said turret rotates during its indexing movement, said post having two screw-threaded portions, one above the other, a nut cooperating with the lower of said portions to secure said post to said index plate, a sleeve threaded on the upper of said screw-threaded portions, a lever fulcrumed on the upper end of said sleeve and operable to rotate the latter around said post, a plurality of spring pressed balls carried by said turret and acting on said index plate to lift the turret free from said plate, a cam operable by said lever for depressing said turret against the action of said spring pressed balls and into locking relationship to said index plate, said plate having parts cooperating with said balls to register said turret yieldingly in its various indexed positions in readiness to be locked in any of said positions to which it is adjusted, and means cooperating with said plate to center said turret for indexing movement independently of said post.

CONRAD E. PETERSON.
GORDON L. OLSON.